(12) United States Patent
Baak et al.

(10) Patent No.: US 7,589,523 B2
(45) Date of Patent: Sep. 15, 2009

(54) MAGNETIC SENSOR

(75) Inventors: Josef Baak, Waldkirch (DE); Olaf Machul, Freiburg (DE)

(73) Assignee: Sick AG, Waldkirch (DE)

( * ) Notice: Subject to any disclaimer, the term of this patent is extended or adjusted under 35 U.S.C. 154(b) by 131 days.

(21) Appl. No.: 11/707,652

(22) Filed: Feb. 16, 2007

(65) Prior Publication Data

US 2007/0216401 A1 Sep. 20, 2007

(30) Foreign Application Priority Data

Feb. 22, 2006 (DE) .................. 10 2006 008 157

(51) Int. Cl.
*G01B 7/14* (2006.01)
*G01R 33/07* (2006.01)
(52) U.S. Cl. .................. 324/207.24; 324/207.2; 324/251
(58) Field of Classification Search ......... 324/173–174, 324/207.2, 207.21, 207.24, 249, 251, 252; 73/514.31, 514.39; 123/612, 617; 338/32 R, 338/32 H
See application file for complete search history.

(56) References Cited

U.S. PATENT DOCUMENTS 5,201,838 A 4/1993 Roudaut

| | | | |
|---|---|---|---|
| 6,497,035 B1 * | 12/2002 | Ratliff | 29/596 |
| 7,263,781 B2 * | 9/2007 | Sielemann | 33/708 |
| 2003/0030431 A1 * | 2/2003 | Reininger | 324/207.2 |
| 2004/0017187 A1 | 1/2004 | Van Ostrand et al. | |

FOREIGN PATENT DOCUMENTS

| DE | 3803293 A1 | 8/1989 |
|---|---|---|
| DE | 195 04 229 A1 | 2/1995 |
| DE | 197 12 829 A1 | 3/1997 |
| DE | 202 11 518 U1 | 7/2002 |
| DE | 102 43 412 A1 | 9/2002 |
| DE | 100 13 196 B4 | 2/2004 |

\* cited by examiner

*Primary Examiner*—Bot L LeDynh
(74) *Attorney, Agent, or Firm*—Townsend and Townsend and Crew, LLP

(57) ABSTRACT

A magnetic sensor for determining positions of an activation magnet along a monitored distance with at least two sensor elements. Both sensor elements are subjected to at least one component of a magnetic field of the activation magnet. An evaluation unit coupled to the sensor element generates at least one switching element that corresponds to a desired magnet position. Each sensor element is operative over the entire monitored distance, and for each desired magnet position there is one unambiguous group of signal values which is used by the sensor elements for generating the switching signals in the evaluation unit.

22 Claims, 2 Drawing Sheets

MAGNETIC SENSOR

RELATED APPLICATIONS

This application claims the priority of German patent application No. 102006008157.9 filed Feb. 22, 2006, which is incorporated herein in its entirety by reference.

BACKGROUND OF THE INVENTION

The present invention concerns a magnetic sensor according to the preamble of claim 1 and a method for determining the positions of an activation magnet according to the preamble of claim 20.

U.S. Pat. No. 5,210,838 discloses a piston and cylinder arrangement with means for determining and confirming a piston position. The piston moves axially inside a cylinder so that a permanent magnet attached to the piston moves with the piston. The magnetic field of the permanent magnet is measured with a Hall-transistor and is used for determining the position of the piston. This arrangement includes means for determining the piston position and has the disadvantage that Hall-effect transistors cover only a small section of the piston's travel distance. To determine piston positions along the entire stroke of the piston, multiple Hall-effect transistors are needed along the path of the piston. For long cylinders, this means that a multitude of Hall-effect transistors are disadvantageously required. To determine the positions of the piston, the individual Hall-effect transistors must be precisely positioned, and each can only determine a single position.

German patent document DE 38 03 293 A1 discloses a magnetically activated, analog and electric path monitor that is useful for linear motions and which can be used for measuring objects of the most diverse type. This path monitor has two Hall-sensors that are spaced apart from each other a distance greater than the distance of the path that is to be monitored and which are arranged at a predetermined distance parallel to the movement axis of the permanent magnet. To obtain a linear signal that unambiguously determines the position of the piston, it is necessary that the spacing between the Hall-sensors exceeds the distance over which measurements are to be taken. An analog electronic output signal is generated from the difference between the absolute values of the Hall-voltages of the two Hall-sensors. Arranging the Hall-sensors at distances that exceed the length over which measurements are to be taken is disadvantageous because both Hall-sensors must then be mounted beyond the reciprocating travel path of the piston. This requires more space and makes mounting the Hall-sensors on the cylinder more difficult. Under some conditions it might even be necessary to mount the Hall-sensors beyond the cylinders. In addition, only the travel path is measured with an analog signal, and no switching signals are generated.

BRIEF SUMMARY OF THE INVENTION

It is an object of the present invention to provide an improved magnetic sensor as well as a method for determining the positions of an activation magnet.

In apparatus terms, this object is attained in accordance with the present invention as is set forth in claim 1 and requires that the magnetic sensor for determining the positions of an activation magnet along a monitored distance have at least two sensor elements. Both sensor elements are subjected to at least one component of a magnetic field of the activation magnet. An evaluation unit coupled to the sensor elements generates at least one switching signal that corresponds to the desired magnet position. Each sensor element is effective over the entire monitored distance. For any desired position of the magnet there is provided an unambiguous group of signal values of the two sensor elements for generating the switching signal in the evaluation unit. In this manner, there is an unambiguous group of signal values for each magnet position so that each magnet position can be unambiguously identified. As a result, the evaluation unit can generate unambiguous position signals for each possible magnet position.

Since the sensor elements are effective over the entire monitored distance, the magnetic sensor can be placed at varying positions along the distance. No precise alignment with respect to the travel distance is required. This significantly simplifies the installation of the magnetic sensors. The start-up phase for systems which monitor a multitude of travel distances with activation magnets is thereby greatly simplified. The magnetic sensors can be freely positioned along the travel distance because a repositioning of the magnetic sensors or sensor elements does not affect the position signals that are being generated. Instead, the positioning signals are determined with electronic inputs on the basis of the stored groups of signal values.

The distance between the sensor elements is independent of the length of the monitored distance. Thus, the distance between the sensor elements and therewith between the magnetic sensors can for example be much shorter than the travel path of the activation magnet that is to be monitored. Due to the small physical size of a magnetic sensor, it is possible to install it in limited, small spaces.

The same magnetic sensor with a constant distance between the sensor elements can be used for monitoring different path lengths. A given magnetic sensor can therefore be used for a multitude of different path lengths. This reduces the number of different sensors that must be kept on hand and thereby simplifies the use and cost of the magnetic sensors.

The sensor element signals can also be processed by the evaluation unit when there are variations in the spacings between them in the direction of the movement axis activation magnet. This again reduces the need for different sensor models and leads to corresponding additional advantages.

In a preferred embodiment, the magnetic sensor is constructed to determine the position of an activation magnet carried by the piston of a pneumatic cylinder. The position of the piston can be determined by the magnetic sensor independent of the length and diameter of the pneumatic cylinder and independent of the mounting location of the magnetic sensor along the pneumatic cylinder so that the same magnetic sensor can be used on a multitude of different pneumatic cylinders.

In a further embodiment of the invention, the activation magnet is a permanent magnet. Permanent magnets are used in pneumatic cylinders as activation magnets. They are compact and require no separate electrical current supply.

The sensor elements are preferably Hall-sensors. Hall-sensors have the advantage that changes in the magnetic field of the permanent magnet carried by a piston can be directly converted into voltage when a current flows though the Hall-sensor. The voltage decreases both perpendicular to the current direction as well as the magnetic field direction relative to the Hall-sensor. Hall-sensors have the advantage that the produced voltages are linearly dependent on the magnetic field. Different magnetic fields can be reached without a saturation barrier. By using two Hall-sensors, two voltage values are generated which form an unambiguous group of signal values that are readily processed in the evaluation unit.

In another embodiment of the invention, the sensor elements are electric windings. In such a case, a sensor signal is generated by the winding in conjunction with an electric oscillation circuit in dependence on the relative position of the permanent magnet. The sensor signal is generated on the basis of frequency changes in the oscillation circuit.

In a further embodiment of the invention, the sensor elements are resistance-changing magnetic sensor elements. Such sensor elements employ resistance changes caused by outer portions of the magnetic field of the permanent magnet. Such resistance changes are simple to detect on the basis of resulting current changes and can readily be further processed. For example, this can be realized by using a Wheatstone bridge. The magnetic sensor elements which change their resistance have a greater sensitivity than Hall-sensors.

It is preferred that the sensor element make use of a radial component of the magnetic field of the permanent magnet. The use of the radial component of the magnetic field leads to a very precise and unambiguous capture of the magnetic field of the permanent magnet carried by the piston. The normally flat Hall-sensors are preferably arranged parallel to the movement axis of the permanent magnet, which allows it to be produced in an optimal, flat, space-saving configuration. In a further development of the invention, an axial component of the magnetic field can be used.

It is preferred that the at least one switching signal is electronically settable. The switching signals can be electronically set for different positions. No repositioning of the sensor on the pneumatic cylinder is necessary. Instead, the piston is simply moved to a desired position. A group of signal values and therewith the position switching signal for that position can be electronically set and stored.

Another aspect of the invention provides at least one key for commencing a learning mode and for teaching the respective switching signals. The respective switching signals for the different piston positions can then be taught by simply activating the key. To do so, the piston is initially moved to the desired position, and thereafter the key is activated to initiate the learning process mode, during which an unambiguous group of signal values is generated for that piston position and then stored. When the piston arrives at this position, the evaluation unit recognizes the unambiguous group of signal values and produces and then proceeds to a corresponding switching signal. In this manner, the switching signal for this piston position is taught and learned. The piston can also be moved to another piston position where the key is again actuated to start the learning mode for this position. For each piston position, the corresponding group of signal values and a multitude of switching signals is taught and learned for different piston positions. The desired switching signals are set independent of the mechanical orientation of the magnetic sensors on the pneumatic cylinder. As a result, the switching positions can be arranged closely adjacent to each other. Accordingly, two switching signals can be taught and learned for piston positions which are separated by as little as a few millimeters.

It can also be useful to generate several position switching signals, for example for four switching points. Two switching points are for the end positions of the piston, and the other two are for generating a further signal prior to the switching point for the end positions, so that the piston of the pneumatic cylinder can be timely braked or decelerated.

In addition, there is at least one display for the learning process. It provides the operator of the magnetic sensor with a visual control of the learning process. After the key has been actuated to initiate the learning mode, and following a successful storing of the group of signal values in the evaluation unit, the evaluation unit provides required optical signals. For example, the evaluation unit can generate a desired light signal display or a flashing light.

Another feature of the present invention is to use the output terminal of the evaluation unit for outputting the switching signal and also as an input for input signals for setting the switching signals in correspondence with the groups of signal values or to initiate the learning mode. It is therefore possible to place the magnetic sensor in its learning mode, or for it to learn the switching signals for the various positions of the activation magnet, via the output, which serves as a connection for the magnetic sensor to the outside. This way, the need for additional connectors, connecting leads or other input devices is eliminated.

The learning of the switching signals or the commencement of the learning mode is initiated in accordance with another aspect of the present invention by applying impulses to the input for the input signals. The impulses can be readily generated by switching the output conduit of the evaluation unit, to which an output voltage is applied, from the outside at predetermined time intervals. The evaluation unit then uses the impulses as input signals to the evaluation unit. Dynamic changes of the inputs as impulses are recognized and can be immediately used by the evaluation unit for setting the switching points. Static signals at the input will not lead to unwanted settings of switching points. It is further preferred that the impulses be coded. The use of faulty instructions from the outside are thereby eliminated. The coding assures that only expected impulses are evaluated and can lead to a learning mode or to a setting of switching signals.

The learning mode can also be initiated on the basis of a predetermined motion sequence by the activation magnet. This allows a setting of the switching points without the need for additional input signals. For example, when, following the activation of the device, the activation magnet moves past the magnetic sensor in a predetermined sequence, the learning mode can be initiated. Thereafter, the position of the activation magnet at an intermediate position can be taught and learned. To confirm the learned position, the activation magnet can again be moved into a predetermined position, for example the end position of the piston in the pneumatic cylinder, or the predetermined motion sequence of the activation magnet can be repeated.

A further embodiment of the invention contemplates to place several activation magnets with differing magnetic field strengths along the monitored distance. Since the activation magnets have differing magnetic fields, it is possible to distinguish between the activation magnets of the evaluation unit on the basis of the magnetic field strengths encountered by the sensor elements. In this manner, a long monitored distance can be fitted with differing activation magnets to determine the positions of the different activation magnets.

In this context, there will be unambiguous further groups of signal values as the further activation magnets become available for a magnet position. The individual magnet positions of the different activation magnets can be unequivocally distinguished from each other to provide unequivocal determinations of the positions of the activation magnets. For example, different activation magnets can be arranged at predetermined spacings on the tool carrier of a machine. Such a tool carrier fitted with activation magnets moves linearly along the magnetic sensor for determining and using the position of the tool carrier. Thus, as the various activation magnets move along the sensor elements, they generate unequivocal groups of signal values from which the precise position of the respective activation magnets, and therewith of the tool carrier, can be determined. This makes it possible to monitor the movement progress of long tools.

Another feature of the present invention is that the switching signal corresponding to a given magnet position is generated within a range of tolerances so that the switching signal remains active for a longer period of time as the piston moves past a given position. This effectively prolongs the switching signals, which is especially useful for very high-speed piston movements.

In addition, the tolerance range of the switching signal can be electronically set. Thus, the duration of the switching signal can be set by either prolonging it or shortening it, in dependency on the speed of the piston.

Another feature of the present invention integrates the sensor elements into a larger electronic component. This advantageously enhances the integration of the magnetic sensor and therewith reduces the number of electronic components that are needed and reduces the cost of the magnetic sensor. By integrating the sensor elements, production tolerances concerning the distances of the sensor elements are also reduced. This assures that unequivocal groups of signal values of like quality are provided for each sensor.

In another embodiment of the invention, the evaluation unit together with the sensor elements are arranged in a common housing for a very compact construction of the sensor. The evaluation unit can be positioned close to the sensor elements and be operatively coupled to them. Further, the sensor signals of the signal elements can be evaluated by the evaluation unit free of disturbances from the outside.

Another feature of the present invention arranges the evaluation unit in a connection plug that is coupled to the magnetic sensor so that the magnetic sensor can be very small. This provides the advantage that the sensor can be used on pneumatic cylinders even if the available space is very limited. This is particularly advantageous if a multitude of pneumatic cylinders are arranged in a limited space, as is the case, for example, in distribution systems and arrangements, where the sensor must have small physical dimensions.

In addition, the magnetic sensor is preferably secured in a groove. Especially desirable is to recess the sensor in a T- or C-groove of the pneumatic cylinder. This allows a mounting of the magnetic sensor on the pneumatic cylinder without increasing the exterior dimensions of the cylinder. As a result, the sensors do not impose restrictions on the construction of the pneumatic cylinders.

If a multitude of switching signals are required for different piston positions, it is advantageous to provide a digital interface and/or a bus system for outputting the switching signals. This in turn permits to direct the switching signal without additional wiring to a high-level control for further evaluation. The digital interface and/or the bus system further facilitates to integrate the magnetic sensor into existing systems, for example existing field buses. For very fast-moving pistons, it is often necessary to transmit a large number of switching signals in a very short time interval. For this, a digital interface is particularly helpful, such as, for example, a serial interface for a field bus system such as Profibus, Devicenet, Interbus and other bus systems.

In a further embodiment of the present invention, the evaluation unit comprises a microprocessor. The microprocessor includes a program for evaluating the pairs of signal values. The program is stored in a read/write memory of the microprocessor so that it can be changed. For evaluating analog sensor signals of the sensor elements, it is preferred that the microprocessor includes an analog/digital converter. By including the program in the microprocessor, it is also quite simple to generate the switching signals on the basis of the sensor signal group values. Thus, all data processing steps for the signals can take place in the microprocessor. For example, an eight-bit microprocessor of the 8051 family can be used. With the microprocessor, all required tasks for evaluating the sensor signals can be optimally included in a single component, and the evaluation unit can be small and compact.

The aspect of the present invention relating to the method of claim 19 requires that for determining the position of the activation magnet along the monitored distance, at least two sensor signals are generated at each of two positions which are spaced apart in the direction of the distance that is to be monitored. These signals are generated by the magnetic field of the activation magnet at a predetermined radial spacing from the movement axis of the activation magnet. Depending on the position of the activation magnet, at least one switching signal is provided. For each magnet position of the activation magnet along the entire monitored distance, the two corresponding sensor signals are available. The two sensor signals, which are used for generating the switching signal, then provide unambiguous groups of signal values for the instantaneous magnet position of the activation magnets.

The method of the present invention generates the unequivocal group of signal values for the magnet position of the activation magnet. Based on this unequivocal group of signal values, the switching signal is produced. As a result, the method of the present invention makes it possible to generate a multitude of switching signals for the various positions of the activation magnet without having to move the sensor elements. The method allows one to generate any desired number of switching signals from the unequivocal sensor signals for all possible positions of the activation magnet carried by the piston.

In yet a further embodiment of the invention, the sensor signals are generated by a radial component of the magnetic field relative to the movement direction of the activation magnet. An evaluation of the radial component provides a higher resolution and simplifies attaining the unequivocal sensor signals as compared to using the axial component of the magnetic field of the activation magnet by arranging the poles of the activation magnet longitudinally in the movement direction of the activation magnet. This has the advantage that it permits a precise determination of the position of the piston.

Specific examples of embodiments of the present invention are described below with reference to the drawings.

DESCRIPTION OF THE PREFERRED EMBODIMENTS

Figure 1:
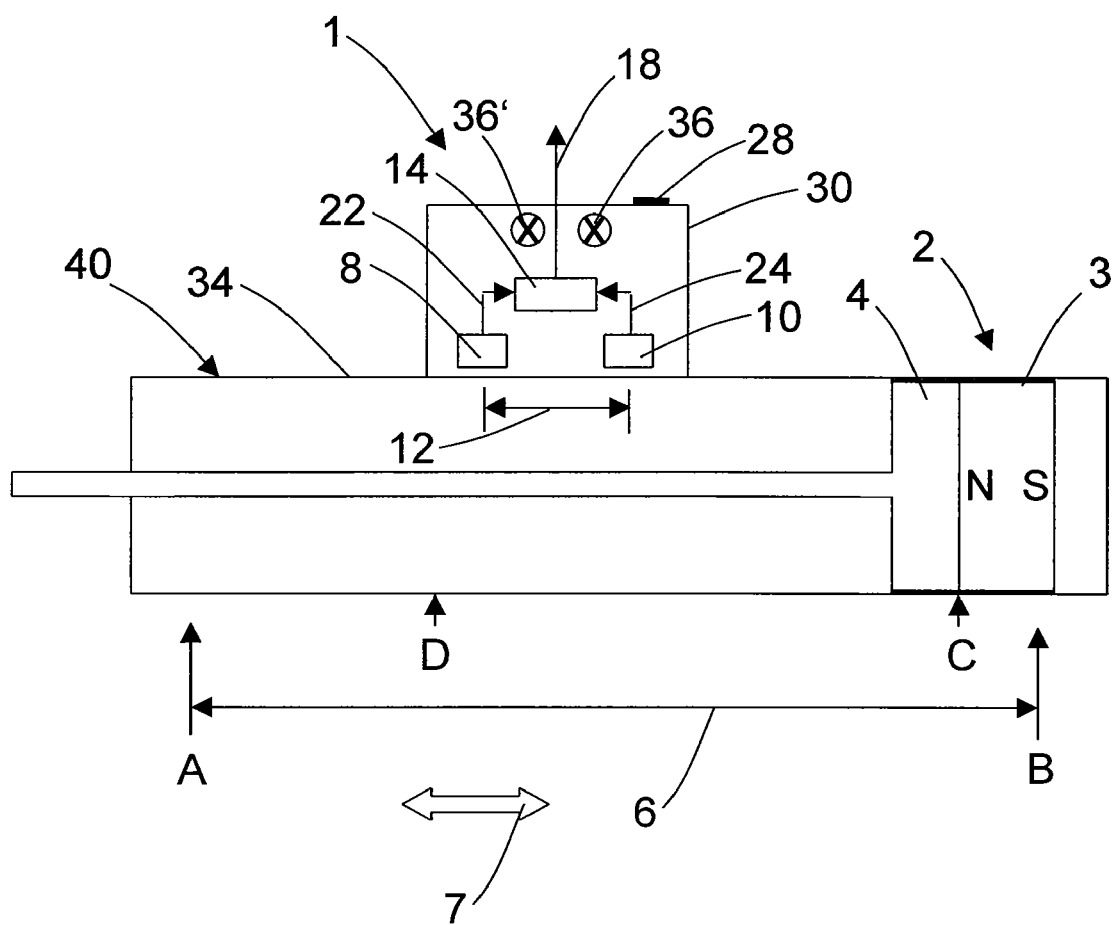
FIG. 1 schematically illustrates a magnetic sensor constructed in accordance with the present invention and an activation magnet carried by a piston.

FIG. 1 shows a pneumatic cylinder 34 with a piston 4 that carries an activation magnet 2. Piston 4 can move in the movement direction 7 over the entire distance 6 to be monitored. The activation magnet 2 has a magnetic orientation that is parallel to the movement direction 7 of piston 4. The activation magnet 2 comprises a permanent magnet 3. The magnetic lines (not shown) of a magnetic field extend outside permanent magnet 3 between a north pole N and a south pole S. As shown, piston 4 is at position C.

Such pneumatic cylinders are employed by industry for moving the control elements of distribution systems. A large number of such pneumatic cylinders 34 are frequently used to effect many different movement processes.

In the illustrated embodiment, a magnetic sensor 1 is mounted on pneumatic cylinder 34 at about the middle of the monitored distance 6 for capturing movements of piston 4 that carries permanent magnet 3. Distance 6 is also referred to as the piston stroke. Magnetic sensor 1 has a first sensor element 8 and a second sensor element 10. Sensor elements 8 and 10 are arranged along the piston stroke, and they are separated by a spacing 12. Spacing 12 between sensor elements 8 and 10 is smaller than piston stroke 6. A first sensor signal 22 from first sensor element 8 and a second sensor signal 24 from second sensor element 10 are fed to an evaluation unit 14. Evaluation unit 14 includes an output for a switching signal 18.

The two sensor elements 8 and 10 are preferably Hall-sensors. When the Hall-sensors are exposed to the magnetic field of permanent magnet 3 and a current flows through them, the Hall-sensor generates an output voltage that is proportional to the product of the magnetic field strength and the current. The output voltage is therefore dependent on the spacing between the permanent magnet 3 and the respective sensor elements 8, 10. When piston 4 with permanent magnet 3 moves from position A to position B, both sensor elements 8 and 10 are subjected to the magnetic flux of permanent magnet 3 over the entire piston stroke 6.

Figure 2:
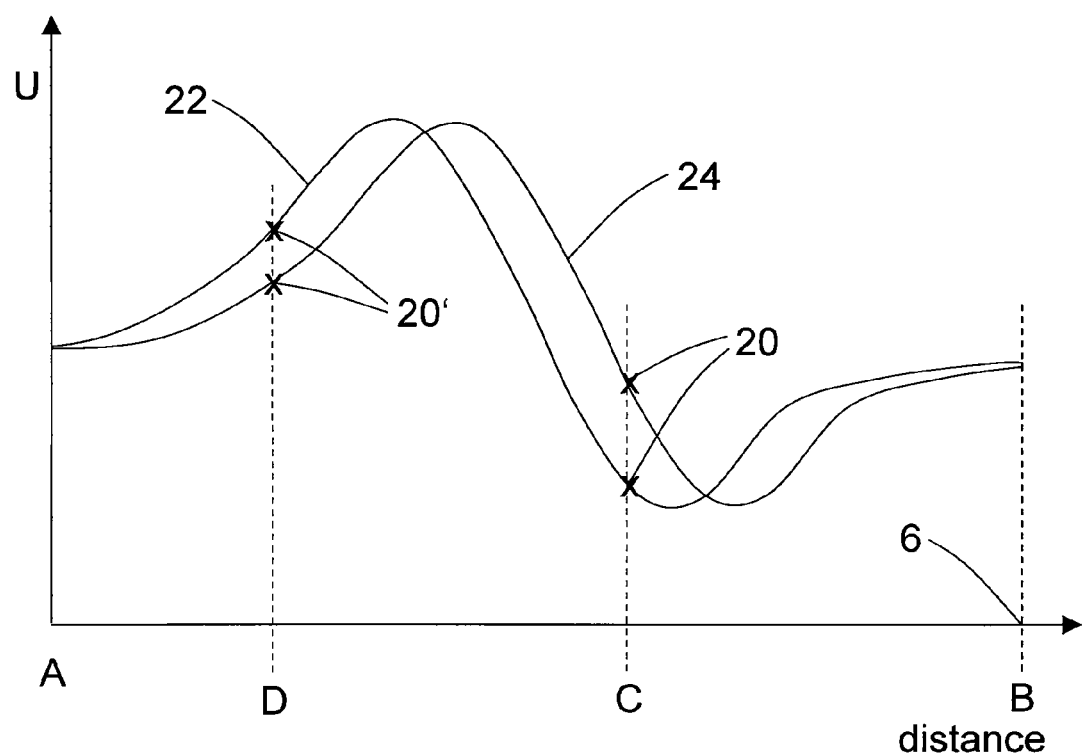
FIG. 2 is a diagram which schematically illustrates the evaluated groups of signals.

The size of the magnetic flux changes is as illustrated in FIG. 2, which shows the two Hall-voltages 22 and 24 of both sensor elements 8, 10 in dependence on the piston stroke. Stroke 6 of the piston from position A in the direction of position B is shown on the abscissa. The ordinate shows the output voltage U of the Hall-sensors. The two sensor signals 22, 24 define an unambiguous group of signal values 20 for each position of the piston that carries the permanent magnet. In the illustrated example, the group of signal values 20 is a signal value pair. For example, at piston position C the signals of the group of signal values 20 have different signal values than the signals of the group of signal values 20' at position D.

As is shown in FIG. 1, the group of signal values is fed to evaluation unit 14 for further processing. Evaluation unit 14 generates a switching signal 18 corresponding to a given group of signal values so that the switching signal 18 relates to a desired position, for example position C of piston 4.

For determining switching signal 18, piston 4 is moved to a desired position C. At this position C, sensor elements 10, 12 feed an unambiguous group of signal values to evaluation unit 14. A key 28 is provided for initiating a learning mode so that switching signal 18 for position C of piston 4 can be electronically stored in evaluation unit 14. For this purpose, evaluation unit 14 includes a memory. Displays 36, 36' are provided so that an operator can observe the learning process. This optical response can be used to confirm that the learning process was successful.

It is also possible to learn and store several switching signals 18. For this it is only necessary to move piston 6 into a new position D the location of which is to be learned by pressing key 28 to initiate the learning mode. In this manner, a large number of switching signals can be sequentially taught and learned. For this it is not necessary to move magnetic sensor 1 relative to pneumatic cylinder 34. The learned piston positions can be arranged closely adjacent to each other and, for example, at a lesser distance than spacing 12 between sensor elements 8 and 10.

Relatively simple uses of pneumatic cylinder 34 may require, for example, four switching signals 18. Two of the switching signals 18 are needed for end positions A and B. In addition to the end positions, two further switching signals 18 are needed for braking or decelerating piston 4 before it reaches its end positions. The two additional switching signals are taken in a direction towards a middle of the piston stroke at positions which are relatively close to the end positions. To display additional positions of piston 4, further switching signals 18 can be learned.

Switching signals 18 can be forwarded via signal leads, digital interfaces or bus systems. Signal leads are optimal when only a few switching signals 18 are needed. Digital interfaces are recommended when a relatively large number of switching signals must be provided.

Evaluation unit 14, sensor elements 8, 10, key 28 for learning the switching signals, and display 36 are preferably arranged in a common housing 30. In this manner, the magnetic sensors can be very compact and include all components that are necessary for the proper functioning of magnetic sensor 1. Only the signal leads, the digital interface or the bus system need to be connected to a overall control arrangement.

Evaluation unit 14 is preferably a microprocessor. Microprocessors have the advantage that the functional elements required by the present invention can be integrated into the microprocessor. With an appropriate program, the functional elements can be electronically addressed, controlled and utilized. Accordingly, the microprocessor includes a memory for storing a program for evaluating the signal value pairs. The memory can be an erasable read/write memory. The microprocessor further includes an analog/digital converter for converting the analog sensor signals 22, 24 of the first and second sensor elements 8, 10. Finally, the microprocessor includes outputs for the switching signals 18. The use of microprocessors permits a compact construction of magnetic sensor 1.

Sensor elements 8, 10 can be integrated into an electronic component. This permits a precise positioning of sensor elements 8, 10 with a spacing 12 between them. Distance deviations as well as sensitivity deviations of sensor elements 8, 10 can thereby be reduced.

LIST OF REFERENCE NUMERALS 1 magnetic sensor
2 activation magnet
3 permanent magnet
4 piston
6 piston stroke, distance
7 movement direction
8 first sensor element
10 second sensor element
12 distance between sensor elements
14 evaluation unit
18 switching signals
20, 20' group of signal values
22 first sensor signal
24 second sensor signal
28 key
30 housing
34 pneumatic cylinder
36, 36' display
A, B, C, D magnetic positions of the piston

What is claimed is:

1. A magnetic sensor for determining positions (A, B, C, D) of an activation magnet (2) along a monitored distance (6) with at least two sensor elements (8, 10) wherein the sensor elements (8, 10) are arranged along the monitored distance and are separated by a spacing (12), each of which is subjected to at least a component of a magnetic field of the activation magnet (2), and an evaluation unit (14) operatively coupled with the sensor elements (8, 10) for generating a switching signal (18) corresponding to at least one desired magnet position (A, B, C, D), each sensor element (8, 10) being operative over the entire monitored distance (6), the spacing between the sensor elements (8, 10) being independent of the length of the monitored distance and shorter than the monitored distance (6), and for any desired magnet position (A, B, C, D) there is provided an unambiguous group of values (20, 20') for generating the switching signal with the evaluation unit which generates an unambiguous positioning signal.

2. A magnetic sensor according to claim 1 comprising a piston carrying the activation magnet (2) in a pneumatic cylinder (34).

3. A magnetic sensor according to claim 1 wherein the activation magnet (2) comprises a permanent magnet (3).

4. A magnetic sensor according to claim 1 wherein the sensor elements (8, 10) comprise one of Hall-sensors, an electrical winding, and a resistance varying magnetic element.

5. A magnetic sensor according to claim 1 wherein the sensor elements (8, 10) are subjected to a radial component of the magnetic field of the activation magnet (2).

6. A magnetic sensor according to claim 1 wherein the sensor elements (8, 10) are subjected to an axial component of the magnetic field of the activation magnet (2).

7. A magnetic sensor according to claim 1 wherein at least one switching signal (18) is electronically settable.

8. A magnetic sensor for determining positions (A, B, C, D) of an activation magnet (2) along a monitored distance (6) with at least two sensor elements (8, 10) wherein the sensor elements (8, 10) are arranged along the monitored distance and are separated by a spacing (12), each of which is subjected to at least a component of a magnetic field of the activation magnet (2), and an evaluation unit (14) operatively coupled with the sensor elements (8, 10) for generating a switching signal (18) corresponding to at least one desired magnet position (A, B, C, D), each sensor element (8, 10) being operative over the entire monitored distance (6), the spacing between the sensor elements (8, 10) being independent of the length of the monitored distance, and for any desired magnet position (A, B, C, D) there is provided an unambiguous group of values (20, 20') for generating the switching signal with the evaluation unit which generates an unambiguous positioning signal, wherein at least one switching signal (18) is electronically settable, and including at least one key (28) for initiating a learning mode for the switching signals (18) and further including at least one display (36, 36') for displaying a learning process to which the switching signals are subjected.

9. A magnetic sensor for determining positions (A, B, C, D) of an activation magnet (2) along a monitored distance (6) with at least two sensor elements (8, 10) wherein the sensor elements (8, 10) are arranged along the monitored distance and are separated by a spacing (12), each of which is subjected to at least a component of a magnetic field of the activation magnet (2), and an evaluation unit (14) operatively coupled with the sensor elements (8, 10) for generating a switching signal (18) corresponding to at least one desired magnet position (A, B, C, D), each sensor element (8, 10) being operative over the entire monitored distance (6), the spacing between the sensor elements (8, 10) being independent of the length of the monitored distance, and for any desired magnet position (A, B, C, D) there is provided an unambiguous group of values (20, 20') for generating the switching signal with the evaluation unit which generates an unambiguous positioning signal, wherein the evaluation unit (14) includes an output for the switching signal (18), the output additionally functioning as an input for incoming signals used for setting the switching signal (18) to correspond to the respective group of signal values or for initiating the learning mode.

10. A magnetic sensor for determining positions (A, B, C, D) of an activation magnet (2) along a monitored distance (6) with at least two sensor elements (8, 10) wherein the sensor elements (8, 10) are arranged along the monitored distance and are separated by a spacing (12), each of which is subjected to at least a component of a magnetic field of the activation magnet (2), and an evaluation unit (14) operatively coupled with the sensor elements (8, 10) for generating a switching signal (18) corresponding to at least one desired magnet position (A, B, C, D), each sensor element (8, 10) being operative over the entire monitored distance (6), the spacing between the sensor elements (8, 10) being independent of the length of the monitored distance, and for any desired magnet position (A, B, C, D) there is provided an unambiguous group of values (20, 20') for generating the switching signal with the evaluation unit which generates an unambiguous positioning signal, and further comprising a plurality of activation magnets located along the monitored distance which have magnetic fields of differing strengths, and wherein for at least one further desired magnetic position (A, B, C, D) a further unambiguous group of signal values is provided over the monitored distance by the additional plurality of activation magnets.

11. A magnetic sensor according to claim 10 wherein the incoming signals comprise a series of coded impulses.

12. A magnetic sensor according to claim 1 wherein the switching signal for a predetermined magnet position is generated within a tolerance range that is electronically settable.

13. A magnetic sensor according to claim 1 wherein the sensor elements (8, 10) are integrated in an electronic component.

14. A magnetic sensor according to claim 1 including a housing (30) and wherein the evaluation unit (14) and the sensor elements (8, 10) are arranged in the housing.

15. A magnetic sensor according to claim 1 including a groove (40) of the pneumatic cylinder (34) in which the sensor is recessed and held.

16. A magnetic sensor according to claim 1 including at least one of a digital interface and/or a bus system for the output of the switching signals, and wherein the evaluation unit comprises a microprocessor.

17. A method for determining positions (A, B, C, D) of an activation magnet (2) along a monitored distance (6) comprising positioning at least two sensor elements at different locations along the monitored distance (6) and, at a predetermined radial spacing from a movement axis of the activation magnet, generating at least one switching signal (18) with a magnetic field of the activation magnet (2) that is dependent on the position (A, B, C, D) of the activation magnet, providing respective sensor signals (22, 24) for each magnet position (A, B, C, D) of the activation magnet over the entire monitored distance (6), the spacing between the sensor elements (8, 10) being independent of the length of the monitored distance and shorter than the monitored distance (6), and forming for any momentary position (A, B, C, D) of the activation magnets (2) an unambiguous signal value pair (20, 20'), and using the signal value pair for producing the switching signal (18) and generating an unambiguous positioning signal.

18. A method according to claim 17, including at least one of electronically setting the switching signals (18) and teaching the switching signals during a learning mode.

19. A method according to claim 17, wherein the switching signal for a magnet position is generated within a range of tolerances, and including electrically setting the range of tolerances.

20. A method for determining positions (A, B, C, D) of an activation magnet (2) along a monitored distance (6) comprising positioning at least two sensor elements at different locations along the monitored distance (6) and, at a predetermined radial spacing from a movement axis of the activation magnet, generating at least one switching signal (18) with a magnetic field of the activation magnet (2) that is dependent on the position (A, B, C, D) of the activation magnet, providing respective sensor signals (22, 24) for each magnet position (A, B, C, D) of the activation magnet over the entire monitored distance (6), the spacing between the sensor elements (8, 10) being independent of the length of the monitored distance, and with the activation magnets (2) forming for any momentary position (A, B, C, D) of the activation magnets (2) an unambiguous signal value pair (20, 20'), and using the signal value pair for producing the switching signal (18) and generating an unambiguous positioning signal, wherein a group of signal values corresponding to the switching signal (18) or an initiation of a learning mode is effected with coded impulses applied to a combined input and output of the evaluation unit (14) for providing the switching signals (18).

21. The magnetic sensor according to claim 15, wherein the groove is a T-groove or a C-groove.

22. A method according to claim 17 wherein the sensor signals are generated through measurement of a radial component of the magnetic field relative to the movement of the activation magnet.

* * * * *